United States Patent  [15] 3,652,233
Swanson  [45] Mar. 28, 1972

[54] METHOD OF IMPROVING RECOVERY OF NEPTUNIUM IN THE PUREX PROCESS

[72] Inventor: John L. Swanson, Richland, Wash.
[73] Assignee: The United States of America as represented by the United States Atomic Energy Commission
[22] Filed: Dec. 29, 1969
[21] Appl. No.: 888,831

[52] U.S. Cl. .................................. 23/341, 23/340, 23/343
[51] Int. Cl. ................................................. B01d 11/00
[58] Field of Search .................... 23/340, 341, 343; 260/644

[56] References Cited

UNITED STATES PATENTS

| | | | |
|---|---|---|---|
| 2,838,366 | 6/1958 | Beaufait | 23/343 |
| 2,847,276 | 8/1958 | Butler | 23/341 |
| 3,004,823 | 10/1961 | Peppard et al. | 23/341 |
| 3,326,811 | 6/1967 | Healy | 23/341 |
| 3,432,276 | 3/1969 | Reas | 23/343 |

OTHER PUBLICATIONS

Bruce et al., ed., Progress in Nuclear Chemistry Series III, Process Chemistry, Vol. 3, Pergamon Press, N.Y., 1961, p. 255.

*Primary Examiner*—Carl D. Quarforth
*Assistant Examiner*—F. M. Gittes
*Attorney*—Roland A. Anderson

[57] ABSTRACT

The recovery of neptunium values from the Purex Process for reprocessing irradiated nuclear reactor fuel is improved by adding a rate-accelerating material to increase the rate of oxidation of the neptunium in the nitric acid solution in the first extraction column. The rate-accelerating material is formed by adding 1-nitropropane to a sodium hydroxide solution to form the aci-form of nitropropane, then adding sodium nitrite and acidifying the solution by the addition of nitric acid.

6 Claims, No Drawings

METHOD OF IMPROVING RECOVERY OF NEPTUNIUM IN THE PUREX PROCESS

CONTRACTUAL ORIGIN OF THE INVENTION

The invention described herein was made in the course of, or under, a contract with the United States Atomic Energy Commission.

BACKGROUND OF THE INVENTION

This invention relates to an improvement in a process for separating neptunium from uranium, plutonium and fission product values and more particularly relates to an improvement in the Purex Process for the processing of irradiated nuclear reactor fuels and for increasing the recovery of neptunium values therefrom. Neptunium recovery from the Purex Process is discussed in "Neptunium Recovery and Purification at Hanford" by R. E. Isaacson and B. F. Judson, I & EC Process Design and Development, Vol. 3, No. 4, Oct. 1964, page 296.

$Np^{237}$ not only has utility as a research isotope but also as a source of $Pu^{238}$. The latter isotope has become important to the general field of space exploration as a heat source for power units.

Neptunium is produced by either of the following reactions:

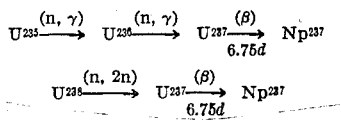

Since either $U^{235}$ or $U^{238}$ is present in most reactors, $Np^{237}$ will be produced, along with various fission products, during fuel burnup. Neptunium exists in the +4, +5 and +6 valence states but is extractable from aqueous solutions with alkyl phosphates only when in either the +4 or +6 state.

The Purex Process is a solvent extraction process used in reprocessing irradiated fuel elements fabricated of normal or slightly enriched uranium. The organic solvent employed is 30 percent tributyl phosphate (TBP) in normal paraffin hydrocarbon (NPH). The salting agent is nitric acid.

In the Purex Process, the irradiated fuel elements are dissolved in nitric acid to form a feed solution. The feed solution then enters the first cycle of the solvent extraction system where a gross separation is effected between the fission products and the uranium/neptunium/plutonium mixture. This is accomplished by counterflow with the TBP organic solvent. The fission products remain in the aqueous phase, the uranium/plutonium and neptunium values transferring to the organic phase. In a second cycle of treatment, the uranium and plutonium are separated. The neptunium values separate with the uranium from the plutonium and the plutonium is further processed to remove fission products. The neptunium and uranium values are separated by contacting the acid wherein they are contained with an organic extractant which removes the uranium values, leaving the neptunium values in the acid solution for further concentration and recovery.

In order to extract the neptunium values along with the plutonium values from the acid solution in the first cycle, the neptunium values must be oxidized to the +6 valence state. This oxidation is presently accomplished in the process by adding $HNO_2$ to the nitric acid feed solution which acts to catalyze the neptunium oxidation. However, the Purex Process is a continuous process and residence times in the separation columns are not sufficient to permit complete oxidation of the neptunium values present in the column to the extractable +6 valence state. Thus a significant percentage of the neptunium values present in the nitric acid feed solution are presently not extracted. The unextracted neptunium values are lost in the aqueous waste solution to the storage tanks, although some may be recovered later by additional processing of the waste solutions.

SUMMARY OF THE INVENTION

I have invented an improvement in the process of extracting neptunium values from a nitric acid nuclear fuel feed solution containing neptunium values, including neptunium in the +5 valence state, with tributyl phosphate wherein there is added to said feed solution a material to increase the rate of oxidation of neptunium having a +5 valence state to a neptunium having a +6 valence state, said material being formed by adding 1-nitropropane to an aqueous solution containing dilute NaOH thereby forming the aci-form of nitropropane, adding sodium nitrite to said solution and adding nitric acid to acidify said solution. The rate-accelerating material when added to the nitric acid feed solution, since it increases the rate at which oxidation of the neptunium occurs in the solution, thus increases the amount of neptunium in the +6 valence state available for extraction. My invention is particularly applicable in the Purex Process resulting in greatly improved recoveries of neptunium values. My improvement as applied to the Purex Process consists of adding a material, called a rate-accelerating material, to the Purex Process during the first cycle separation. This material increases the rate at which the neptunium values are oxidized from the inextractable +5 valence state to the extractable +6 valence state, thus oxidizing more of the neptunium present in the feed solution during the period of residence in the extraction column. This greatly increases the amount of neptunium values which may be extracted from the acidic feed solution and which may then be separated from the co-extracted uranium and plutonium values by subsequent processing. By my process, the rate-accelerating material is made by adding 1-nitropropane to a dilute solution of NaOH to form the aci-form of 1-nitropropane, then adding sodium nitrite and acidifying the solution by the addition of nitric acid. The rate-accelerating material is then added to the first cycle extraction column where it increases the oxidation rate of the neptunium values present in the nitric acid feed solution, thus permitting more complete extraction of these values and improving the recovery thereof.

It is therefore an object of this invention to improve the recovery of neptunium values from the nitric acid feed solution in the Purex Process.

DESCRIPTION OF THE PREFERRED EMBODIMENT

These and other objects may be achieved by making the acid feed solution from 0.005 to 0.02 M in added nitropropane which is made by adding up to 2 M of 1-nitropropane to an aqueous solution containing up to 2 M NaOH to form the aci-form of 1-nitropropane, adding sodium nitrite to the solution in a ratio of 0.3 to 0.6 nitrite to 1-nitropropane and acidifying the solution by adding sufficient nitric acid so that the final solution contains from about 3 M to 8 M of nitric acid. Because the composition of the resulting product, which is the rate-accelerating material (RAM), is unknown, the amount of material to be added to the acid feed solution is determined by reference to the concentration of 1-nitropropane which would have been present had it not been consumed in the formation of the RAM. This is referred to as added nitropropane. Thus sufficient quantity of the solution is fed into the first column so that the acid feed solution contains about 0.01 M of the added nitropropane. The presence of the added nitropropane in the column accelerates the oxidation rate of the neptunium present therein, thus causing a high percentage of the total neptunium present to oxidize to the extractable +6 valence, permitting extraction of more of the neptunium from the acid feed solution into the organic extractant. The neptunium values are then separated from the uranium and plutonium values which are also extracted and further purified.

The aci-form of 1-nitropropane is prepared by the addition of 1-nitropropane to an aqueous solution of NaOH. Solutions having concentrations of 1-nitropropane as high as 2 M may be prepared. The amount of NaOH used is the same as, or just slightly in excess of, that required to convert the nitropropane to the aci-form.

The sodium nitrite may be added to the sodium hydroxide solution either before or after the addition of the 1-nitropropane. The amount of sodium nitrite varies with the 1-nitropropane present, with a ratio of nitrite to 1-nitropropane of 0.3 to 0.6 being operable. However, 0.4 is preferred as the best results are achieved with this ratio.

After formation of the aci-form of 1-nitropropane, the solution with the aci-form and the nitrite is acidified by mixing with nitric acid to form the rate-accelerating material. The concentration of $HNO_3$ in the final solution may vary from 3 to 8 M, although the preferred concentration is 7 M. Sufficient acid must be mixed with the solution containing the aci-form and sodium nitrite to account for dilution of the acid and any neutralization which may occur due to excess NaOH present.

It is preferred that the aci-form solution and the nitric acid be fed into a reactor simultaneously while mixing the solutions well and continuously withdrawing the product formed. The solution containing the RAM is immediately added to the nitric acid feed solution in the extraction column.

Residence time of the solutions in the reactor necessary for formation of the rate-accelerating material is found to be dependent upon the temperature at which the mixing occurs. Thus good production of RAM was obtained with a residence time of 2 minutes at 35° C. At temperatures much over 36° C. for this residence time, the amount of product produced began to diminish. Almost as good results were achieved with a residence time of about 9 minutes at a temperature of about 30° C. Again for this time period, temperature variance without a time change caused a decrease in product formed.

Agitation or stirring speed at which the solutions were mixed was also found to affect the amount of RAM produced. Thus sufficient agitation is necessary to ensure good mixing of the solutions, while too much agitation will cause a decrease in the amount of product formed.

Sufficient RAM is added to the first cycle column in the Purex cycle where the organic extractant contacts the nitric acid feed solution (HA column) so that the aqueous nitric acid feed phase contains from 0.005 to 0.02 M in added nitropropane. While lower concentrations would accelerate the oxidation sufficiently to increase yields of neptunium values, the RAM is unstable due to the radiation present in the column so the higher concentrations are preferred to ensure essentially complete oxidation of neptunium. Concentrations greater than 0.02 M will increase the waste volumes unnecessarily, thus adding to the cost of the operation.

Formation of the rate-accelerating material is apparently possible only with primary nitroalkanes. The formation of RAM was attempted with the aci-form of 2-nitropropane and 2-nitrobutane, but no increase in the oxidation rate of neptunium was noted from the product obtained therefrom.

The identity of the RAM is unknown and it may be one or more compounds. Based on the sensitivity of the RAM formation to preparative conditions, it is believed that RAM is an intermediate in, or a byproduct of, one or more of the reactions known to occur on the acidification of the aci-form of a primary nitroalkane. These are (a) conversion to the true nitroalkane, (b) conversion to the aldehyde and $N_2O$ and (c) conversion to the nitrolic acid followed by conversion to the carboxylic acid.

The following examples are given as illustrative of the process of the invention and are not to be taken as limiting the scope or extent of the invention.

EXAMPLE I

To determine the effect of RAM on the Np(V) oxidation state a series of experiments were run. The solutions contained 3.1 M $HNO_3$, $5 \times 10^{-4}$ M $NaNO_2$ and varying amounts of 1-nitropropane at about 24° C. From the results of the experiments, the one-half times listed in the table below were calculated.

| $[RNO_2]$ | $k_2[RAM]/[RNO_2]$ | $k_2[RAM]$ | $t_{1/2}$ (min.) |
|---|---|---|---|
| 0.001 | | | 30 |
| 0.001 | $0.1 \times 10^4$ | 1 | 7 |
| 0.01 | $1.0 \times 10^4$ | 10 | 0.8 |
| 0.01 | $0.1 \times 10^4$ | 10 | 0.8 |
| 0.01 | $1.0 \times 10^4$ | 100 | 0.09 |

NOTE.—
$RNO_2$=concentration of nitropropane which would have been present had it not been condensed in the formation of RAM.
$k_2[RAM]$=a measure of the desired property—that of making Np(V) oxidize more rapidly.
$t_{1/2}$=time necessary for one-half of the Np(V) present in the solution to oxidize to Np(VI)

As can be seen from the above results, the effect of the RAM is to greatly decrease the time necessary to oxidize the Np(V) values present to the extractable Np(VI) state.

EXAMPLE II 0.5 M of 1-nitropropane was added to an aqueous solution containing 0.6 M NaOH and 0.2 M sodium nitrite. 5.2 ml./min. of this solution were fed along with 11.4 ml./min. of 11.0 M $HNO_3$ solution into a stirred reactor having a volume of 32 ml. at a temperature of 37° C. These values gave a solution composition of 0.16 M added nitropropane and 7.4 M $HNO_3$. The residence time in the reactor was 2 minutes. Sufficient quantity of this solution was added to a 3.1 M $HNO_3$ solution containing $5 \times 10^{-4}$ sodium nitrite and $5 \times 10^{-4}$ M neptunium values to make the solution $10^{-3}$ M in added nitropropane. The one-half time, which is the time required for the reaction to proceed half of the way to the equilibrium position, was found to be 1.1 minutes at 25° C. This compares with a similar experiment which varied only in containing no RAM wherein the one-half time of neptunium oxidation was 30 minutes.

It can readily be seen from the above experiments that the addition of RAM has a profound effect upon the rate of oxidation of neptunium values from the +5 to the +6 valence state.

It will be understood that the invention is not to be limited to the details given herein but that it may be modified within the scope of the appended claims.

The embodiments of the invention in which an exclusive property or privilege is claimed are defined as follows:

1. The process of increasing the amount of neptunium vales extractable by tributyl phosphate from a nitric acid feed solution of irradiated fuel elements fabricated of normal or enriched uranium and containing neptunium in the +5 valence state, uranium, plutonium and fission products which comprises making the feed solution from 0.005 to 0.02 M in nitropropane by the addition of an oxidation rate accelerating material made by adding up to 2 M of 1-nitropropane to an aqueous solution containing up to 2 M NaOH to form the aci-form 1-nitropropane, adding sodium nitrite to the solution in a ratio of 0.3 to 0.6 parts of sodium nitrite to one part of 1-nitropropane and acidifying the solution by adding sufficient nitric acid so that the final solution is from about 3 M to 8 M in nitric acid and contacting said nitropropane containing feed solution with an organic extractant of 30 percent tributyl phosphate in normal paraffin hydrocarbon, thereby extracting the uranium, plutonium and neptunium values.

2. The process of claim 1 wherein the NaOH is present in slight excess of that necessary to convert the --nitropropane to the aci-form.

3. The process of claim 2 wherein the NaOH solution is 0.6 M in NaOH, 0.5 M in 1-nitropropane, 0.2 M in sodium nitrite, the solution is made 6 M in $HNO_3$ and a sufficient amount of this solution is added to the nitric acid feed solution to make it 0.02 M in nitropropane.

4. In the process for separating neptunium values from a nitric acid feed solution containing neptunium in the +5 valence state, uranium, plutonium and fission product values by adding nitrous acid to the feed solution to oxidize the neptunium values from the inextractable +5 valence state to the extractable +6 valence state, contacting the acid feed solution with an organic extractant of 30 percent tributyl phosphate in normal paraffin hydrocarbon, thereby extracting the uranium, plutonium and neptunium values, and separating the neptunium values from the uranium and plutonium values, the improvement in the oxidation of the neptunium values comprising: making the nitric acid feed solution from 0.005 to 0.02 M in nitropropane by the addition of an oxidation rate accelerating material said material formed by adding up to 2 M 1-nitropropane to an aqueous sodium solution containing up to 2 M sodium hydroxide to form the aci-form of nitropropane, adding sodium nitrite to said solution in a ratio of 0.3 to 0.6 parts of sodium nitrite to one part of 1-nitropropane and acidifying the solution by adding sufficient nitric acid, so that the final solution is about 3 M to 8 M in nitric acid thereby forming the rate-accelerating material, said material when added to the nitric acid feed solution thereby increasing the rate at which said oxidation of said neptunium occurs in said solution, thus increasing the amount of neptunium in the +6 valence state available for extraction.

5. The process of claim 4 wherein the NaOH is present in slight excess of that necessary to convert the 1-nitropropane to the aci-form.

6. The process of claim 5 wherein the NaOH solution is 0.6 M in NaOH, 0.5 M in 1-nitropropane, 0.2 in M sodium nitrite, the solution is made 6 M in $HNO_3$ and a sufficient amount of this solution is added to the nitric acid feed solution to make it 0.02 M in nitropropane.

* * * * *